United States Patent [19]

Jakobsen

[11] Patent Number: 4,924,581

[45] Date of Patent: May 15, 1990

[54] TURBINE AIR SEAL REPAIR PROCESS

[75] Inventor: Karl S. Jakobsen, Somers, Conn.

[73] Assignee: Techniair, Inc., Tolland, Conn.

[21] Appl. No.: 275,230

[22] Filed: Nov. 22, 1988

[51] Int. Cl.$^5$ .......................... B23P 15/02; B23P 7/00
[52] U.S. Cl. .............................. 29/402.02; 29/402.07; 29/402.08; 29/402.13; 29/402.16
[58] Field of Search .......... 29/402.02, 402.06, 402.08, 29/402.12, 402.13, 402.16, 156.8 B; 228/119; 415/173.3, 173.4, 216, 217

[56] References Cited

U.S. PATENT DOCUMENTS 4,028,788  6/1977  DeMusis .................. 29/156.8 B
4,285,108  8/1981  Arrigori .................. 29/402.13 X Primary Examiner—Timothy V. Eley
Attorney, Agent, or Firm—Chilton, Alix & Van Kirk

[57] ABSTRACT

A repair process for repairing damaged turbine air seals comprises completely removing the damaged air seals and forming a mechanical seat in the seal base. A replacement ring of the desired seal alloy is positioned in the seat and bonded to the base by a brazing process. The replacement ring is then machined to form reconstructed knife edge seals.

11 Claims, 2 Drawing Sheets

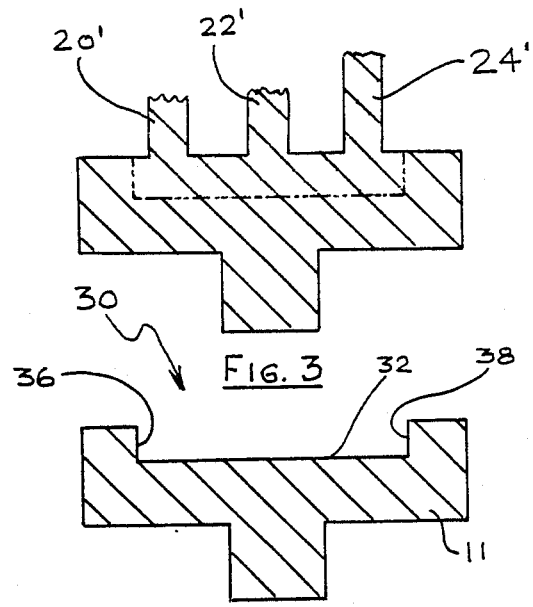
FIG. 3
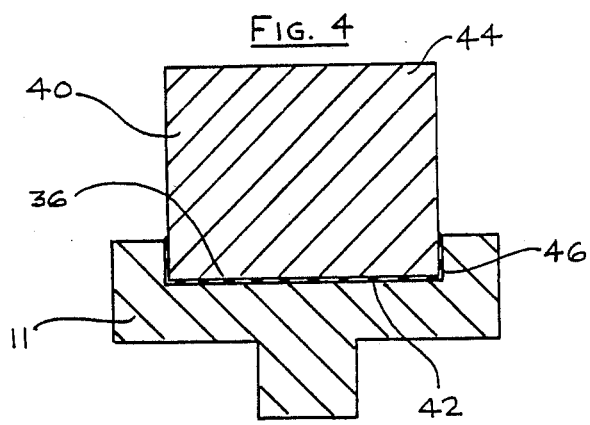
FIG. 4
FIG. 5
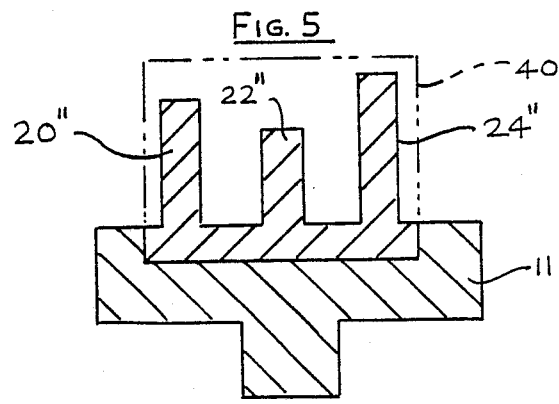
FIG. 6

TURBINE AIR SEAL REPAIR PROCESS

BACKGROUND OF THE INVENTION

This invention relates generally to structures which form an air seal in gas turbine components and the like. More particularly, the present invention relates to a process for repairing damaged and corroded knife edge air seals of a turbine.

Turbine blades of gas turbines to which the invention is adapted employ a multiplicity of blades mounted around the peripheral portion of a rotatable disk. The disk rotates within an enclosed duct of a gas turbine under the drive forces of gases which have a high pressure and a high temperature. Air seals are required to seal between the ducts and the circumferential rings formed by mating shrouds of the turbine blades to seal the gases in the turbines. The knife edge components which form the turbine air seals are relatively thin, typically on the order of 0.018 to 0.020 inches thick, and are typically formed from nickel based super alloys.

High temperature gases which pass over the turbine air seals cause the turbine air seals to wear or corrode. The thermal effects of combustion gas contaminants, the thermal stresses imposed by the cyclic nature of the operation of the turbine and the frictional engagement of the rotating blade tip against the stationary turbine outer air seal are some of the factors which cause damage to the air seals over time. A principal manifestation of the damage is an increase in the clearance gap between the seals and the blade tips. The increase in the clearance gap decreases the turbine efficiencies due to the power loss from escaping gases. In addition, turbine components which are heated by the escaping hot gases tend to deteriorate. A significant segment of turbine technology is directed to the repair of turbine air seals and the maintenance of air seal integrity.

Conventional turbine air seal repair technology in one approach involves the machining of portions of the corroded damaged knife edge portions and the application of a weld build-up of the worn seal edges. The weldment is then remachined to the original specifications of the turbine component. However, considerable design and tooling efforts are frequently expended in controlling the distortion inherent in the welding process which causes some weld metal shrinkage and part distortion. Additional tooling is frequently provided to correct distortion where shrinkage otherwise cannot be controlled. The design and tooling requirements for controlling distortion may result in a repair process which is not cost effective in comparison with the cost of new replacement parts.

Arrigoni, U.S. Pat. No. 4,285,108 discloses a method wherein a damaged turbine air seal is removed by an abrasive belt to create a stub-like structure. A piece of material is joined to the stub such as by welding or brazing. The air seal weldment is then finished by an abrasive belting apparatus. DeMusis, U.S. Pat. No. 4,028,788 discloses a method wherein a bead of welding material is added to opposite side portions and end portions of an air seal flange to build up the worn areas. The built-up flange materials are then removed to reshape the air seal flange. McDonald et al, U.S. Pat. No. 3,771,978 discloses a method for repairing the knife edge fin wherein a knife edge is honed and a groove is reamed in the upper portion of the blade. A metallic wedge is mounted in the groove and secured by a thermal fitting process. The external circumferential edge is then sharpened to form the knife edge of the air seal.

SUMMARY OF THE INVENTION

Briefly stated, the invention in a preferred form is a repair process for repairing damaged turbine air seals which are typically formed from a seal assembly which has at least one projecting knife edge. At least one of the damaged knife edges is completely removed from the seal assembly by a machining process so as to form a base. The base is machined to form a recess which defines a mechanical seat. A replacement member, which is preferably in the form of a ring insert, is formed from the same alloy as the removed knife edges and is dimensioned to be received in the seat. The replacement member is positioned in the seat. The replacement member is bonded to the seal base by a brazing process. The replacement member is then remachined to form a reconstructed knife edge having the desired dimensions and spacial orientation. In one disclosed process, three transversely spaced knife edges are removed from the seal assembly. The base recess has a transverse width which is greater than the maximum transverse extent of the removed knife edges. The seal base is heated and the replacement member is cooled to permit the member to be inserted in the seat.

An object of the invention is to provide a new and improved turbine air seal repair process.

Another object of the invention is to provide a new and improved turbine air seal repair process which can be accomplished in an efficient manner and which is cost effective.

A further object of the invention is to provide a new and improved turbine repair process wherein the resulting repaired turbine air seal is not susceptible to weld metal shrinkage nor is the repaired air seal compromised by corrosion or damage to the seal base.

A yet further object of the invention is to provide a new and improved air seal repair process which provides a relatively distortion free air seal repair without requiring elaborate tooling and which has a high degree of strength and corrosion resistance characteristics.

Other objects and advantages of the invention will become apparent from the drawings and the specification.

BRIEF DESCRIPTION OF THE DRAWINGS

FIG. 3 is an enlarged fragmentary sectional view of a damaged turbine air seal structure taken generally along the line of 3—3 of FIG. 2;

FIG. 4 is an enlarged fragmentary sectional view of the turbine air seal structure illustrating one stage in the repair process of the present invention;

FIG. 5 is an enlarged fragmentary sectional view of the turbine air seal structure illustrating a second stage in the repair process of the present invention; and FIG. 6 is an enlarged fragmentary sectional view, partly in schematic, of a turbine air seal structure illustrating a third stage in the repair process of the present invention.

DETAILED DESCRIPTION OF THE INVENTION

Figure 2:
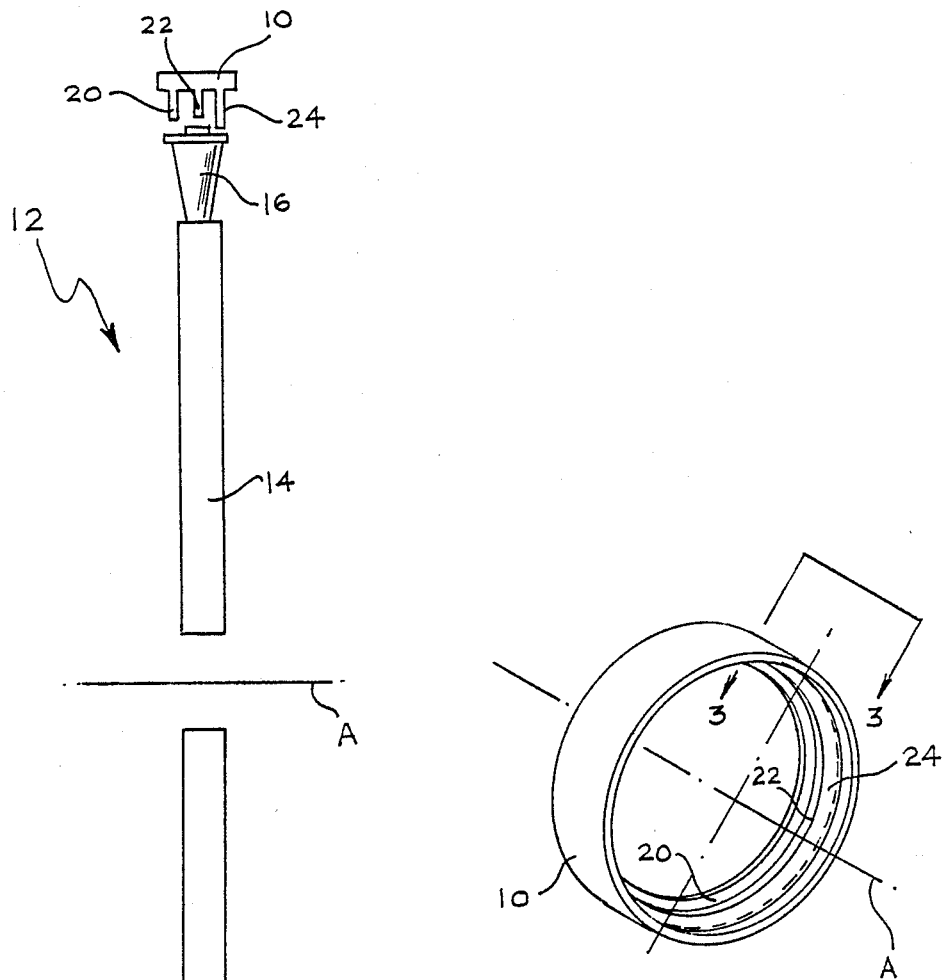
FIG. 2 is a reduced perspective view of the air seal structure of FIG. 1.

With reference to the drawings wherein like numerals represent like parts throughout the several figures, the repair process in accordance with the present invention in a preferred embodiment is practiced in connection with repairing air seals of a stationary seal body 10 of a gas turbine designated generally by the numeral 12. The turbine 12 includes a wheel 14 and a multiplicity of blades 16 which rotate about axis A. The repair process has applicability in connection with repairing air seal structures, including blades which rotate within a gas turbine machine and stationary vanes which are non-rotating components.

Figure 1:
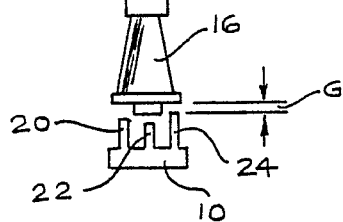
FIG. 1 is a central cross-sectional view, partly in schematic, of a turbine blade assembly and turbine air seal structure to which the repair process of the present invention is preferably directed.

A typical new gas turbine comprising a stationary outer seal body 10 having three projecting air seal structures or knife edges which function to form a seal with the end of turbine blade 16 is illustrated in FIG. 1. First, second and third knife edges 20, 22, and 24 respectively, which form the air seals are illustrated in a relatively new state. The inner ends of the knife edges extend radially inwardly from the annular seal body 10 to define a very small gap G (exaggerated in the drawing) with the end of the turbine blade 16. The knife edges and seal body are preferably constructed as a unitary structure. Alternatively, the knife edges may be directly mounted to the base of the seal body. The air seal knife edges and the seal body are preferably manufactured from a nickel super alloy. The specific alloy, the number of air seal knife edges and the specific air seal configuration are not a limitation of the repair process of the present invention. Although the invention is described in relation to knife edge seals, it should be appreciated that the repair process has applicability in connection with vane seals and turbine blade fins as well as other analogous sealing structures.

It should be appreciated that the knife edges 20, 22, and 24 are relatively thin, having a typical thickness dimension on the order of 0.018 to 0.020 inches. Because of the relatively thin structure of the knife edges, any repair of the air seals must be undertaken with care that the reconstructed repaired air seal structure be essentially replicative of the original new air seal structure with respect to both dimension and location so that proper sealing with the blade may be achieved.

With reference to FIG. 3, a seal assembly having damaged knife edges is designated by the corresponding numbers 20', 22', and 24'. The foregoing knife edges 20', 22', and 24' are particularly damaged, e.g., corroded, pitted, cracked, etc., at the end portions which seal with the blade. The damaged air seals may, for example, result from thermal stresses, frictional engagement with the rotating blade tip, corrosion due to the contaminants within the turbine or from high pressure forces within the turbine. The damage is ordinarily quite non-uniform throughout the knife edge structures.

In accordance with the invention, the damaged seal body 10 is snapped onto a concentric fixture of a vertical turret lathe (VTL) machine. The damaged seal fins 20', 22', and 24' are completely removed from the seal body by the VTL machining process. The machining process additionally removes sufficient material from the air seal base 10 so as to form a machined seal base 11 having an annular recess which functions as a mechanical seat 30 as illustrated in FIGS. 5 and 6. The seat 30 includes a generally cylindrical mounting surface 32 which preferably has a uniform width defined between spaced annular seating shoulders 36 and 38. The depth of the recess or diametral dimension of the shoulders 36 and 38 is typically on the order of 0.050 inches. The seal base 11 may spring to an out-of-round condition after the machining is completed.

A replacement ring 40 is rolled, welded and/or machined so as to have an outer diametral surface 42 which closely dimensionally approximates the mounting surface 32 of the mechanical seat 30. The outer diametral surface 42 is finished to have an outside diameter having a 0 to 0.010 inch interference fit with the seat 30. The section of the ring 40 is generally rectangular in shape having an outside surface 42 width approximately equal to the width of seat surface 32 and a height which extends to be a least greater than the desired maximum radial inward extent of the repaired knife edge. The material used for the ring 40 is preferably the same alloy as employed in the original air seal knife edges 20, 22, and 24. The ring 40 is positioned and pressed in place to the mechanical seat 30 by heating the seal base 11 and cooling the replacement ring 40. The replacement ring assembly 40 is constructed within sufficient geometrical tolerances and has sufficient rigidity as to provide self-rounding of the mounted ring assembly 40 in the event that the seal base 11 has an out-of-round condition. In order to insure a true round condition is achieved from the repaired seal body, a fixture ring (not illustrated) of 300 series stainless steel may be inserted at the inside diametral surface 44 of the replacement ring 40.

The replacement ring 40 is brazed in position to the seal base 11 in a furnace braze cycle wherein the components are exposed to a high temperature on the order of 2000° Fahrenheit, nominal. The braze alloy 46 may be a nickel chrome alloy. Other alloys may also be suitable.

After completion of the cycle wherein the replacement ring 40 is brazed onto the mechanical seal base 11, the ring fixture is removed. The replacement ring base assembly is clamped onto a machining fixture of a VTL and machined so that new reconstructed knife edges 20", 22", and 24" are cut from the replacement ring. The new knife edges 20", 22", and 24" are substantially identical in dimension, shape and location to the original new knife edges 20, 22, and 24.

The reconstructed knife edge seals which are typically on the order 0.018 to 0.020 inches in thickness are accomplished in an efficient manner having significant advantages over the conventional weld repair processes. For example, the noted brazing process eliminates any metal shrinkage and distortion which is ordinarily associated with weld repairs. In addition, the replacement ring 40 functions as a self-fixturing structure which eliminates any need for elaborate fixturing to achieve a symmetrically rounded seal assembly. The replacement ring 40 provides a forged quality material thereby resulting in a more durable repair. In conventional weld repair processes, the repair weldments may be joined to corroded base metals and the repaired seal body may contain trapped voids or cavities. The bulk of such damaged base material in the present repair process is removed during the seat forming machining stage. The elimination of the welding related structural distortion also eliminates the requirement for expensive, elaborate straightening tooling. Such tooling frequently is not effective in producing a distortion-free seal. In addition, the relatively high brazing temperatures tend to relieve process stresses on the seal assembly while providing a braze having a high degree of strength and corrosion resistance at the seal operating temperatures.

It should be appreciated that the turbine seals formed at the outside periphery of a seal body may also be repaired in a manner analogous to that described relative to the knife edge seal structures extending from the inside diameter, as illustrated in the drawings. In addition, rotating seals and spacers may also be repaired by the same repair process employing forged replacement rings as substitution for the described welded rings. It will be appreciated that forged components are typically employed, rather than welded components, for rotating structures because of the favorable dynamic mechanical properties.

While a preferred embodiment of the foregoing repair process has been set forth for purposes of illustration, the foregoing description should not be deemed a limitation of the invention herein. Accordingly, various modifications, adaptations, and alternatives may occur to one skilled in the art without departing from the spirit and the scope of the present invention.

What is claimed is:

1. A repair process for repairing damaged turbine air seals which are formed from a seal assembly having at least one projecting seal member comprising:
   (a) completely removing at least one damaged seal member from said seal assembly to form a base;
   (b) machining said base to form a recess defining a mechanical seat;
   (c) providing a replacement member which is dimensioned to be closely received in said seat;
   (d) positioning said replacement member in said seat;
   (e) bonding said replacement member to said seal base by a brazing process; and
   (f) machining said replacement member to form a reconstructed seal member.

2. The repair process of claim 1 wherein step (a) comprises machining said assembly to completely remove a plurality of transversely spaced seal members.

3. The repair process of claim 2 wherein step (f) comprises forming a plurality of spaced reconstructed seal members having a transverse spacing generally equivalent to the removed seal members.

4. The repair process of claim 1 wherein step (b) comprises removing material from said seal base to form a recess having a width which is greater than the maximum transverse extent of the removed seal members.

5. The repair process of claim 1 wherein step (d) further comprises heating said seal base and cooling said replacement member.

6. A repair process for repairing damaged turbine air seals which are formed from an annular seal assembly having at least one radially projecting knife edge seal comprising:
   (a) completely removing at least one damaged knife edge seal from said assembly to form a base;
   (b) machining said base to form a recess defining a mechanical seat having a generally uniform width W and a depth d;
   (c) providing a replacement structure of the same material as the at least one removed knife edge seal and having a width which is approximately equal to width W and a thickness which is at least equal to the sum of depth d and the desired maximum radial projection of a knife edge seal from the base;
   (d) forcing the replacement structure into said seat so as to form a replacement ring;
   (e) bonding said replacement ring to said seal base by means of a high temperature brazing process; and
   (f) machining said replacement ring to form at least one reconstructed knife edge seal.

7. The repair process of claim 6 wherein step (a) comprises machining said assembly to completely remove a plurality of transversely spaced knife edge seals.

8. The repair process of claim 7 wherein step (f) comprises forming a plurality of spaced reconstructed knife edge seals having a transverse spacing generally equivalent to the removed knife edge seals.

9. The repair process of claim 6 wherein step (b) further comprises removing material from said seal base to form a recess having a width which is greater than the maximum transverse extent of the at least one removed knife edge seal.

10. The repair process of claim 6 wherein step (d) further comprises heating said seal base and cooling said replacement structure.

11. The repair process of claim 10 wherein step (d) further comprises forcing said seal base into a true round condition.

* * * * *